(12) United States Patent
Petitfrere

(10) Patent No.: US 8,181,488 B2
(45) Date of Patent: May 22, 2012

(54) METHOD FOR OVERCLADDING AN OPTICAL FIBER PREFORM

(75) Inventor: Emmanuel Petitfrere, Villeneuve d'Ascq (FR)

(73) Assignee: Draka Comteq, B.V., Amsterdam (NL)

( * ) Notice: Subject to any disclaimer, the term of this patent is extended or adjusted under 35 U.S.C. 154(b) by 1277 days.

(21) Appl. No.: 11/765,083

(22) Filed: Jun. 19, 2007

(65) Prior Publication Data

US 2007/0289332 A1  Dec. 20, 2007

(30) Foreign Application Priority Data

Jun. 19, 2006 (FR) .................................... 06 05417

(51) Int. Cl.
*C03B 37/07* (2006.01)
(52) U.S. Cl. ........................................... 65/421; 65/382
(58) Field of Classification Search ............... 65/377, 65/484, 380, 382, 490, 491, 413, 421, 376
See application file for complete search history.

(56) References Cited

U.S. PATENT DOCUMENTS

| | | | | |
|---|---|---|---|---|
| 4,874,416 A | * | 10/1989 | Yokokawa et al. | 65/382 |
| 5,183,490 A | | 2/1993 | Mikami et al. | |
| 5,958,102 A | * | 9/1999 | Shimada et al. | 65/382 |
| 2001/0015080 A1 | | 8/2001 | Ripoche et al. | |
| 2003/0024273 A1 | * | 2/2003 | Ishihara | 65/382 |
| 2003/0115908 A1 | * | 6/2003 | Hammerle et al. | 65/379 |
| 2007/0289332 A1 | | 12/2007 | Petitfrere | |

FOREIGN PATENT DOCUMENTS

| | | |
|---|---|---|
| EP | 0482348 A2 | 4/1992 |
| EP | 0845441 A1 | 6/1998 |
| EP | 1112975 A | 7/2001 |
| EP | 1279646 A2 | 1/2003 |
| EP | 1870382 A1 | 12/2007 |

OTHER PUBLICATIONS

European Search Report for corresponding European Application No. 07010956, dated Aug. 29, 2007.
French Search Report and Written Opinion for Counterpart Application No. FR 0605417, mailed on Mar. 1, 2007.

\* cited by examiner

*Primary Examiner* — Matthew Daniels
*Assistant Examiner* — Yana Belyaev
(74) *Attorney, Agent, or Firm* — Summa, Additon & Ashe, P.A.

(57) ABSTRACT

Method for overcladding an optical fiber preform with a given target diameter ($D_0$) of the final preform includes providing a primary preform to be overcladded, and successively depositing first overcladding layers by projecting and vitrifying silica particles on the primary preform moving in relative translation with a plasma torch. Each first overcladding layer has a given uniform thickness (d) and is deposited at a given, constant silica particle flow rate and at a given, constant translation speed. The method also includes the detection of a preform diameter ($D_1$) greater than a given threshold (S) and the deposition of a final overcladding layer having the remaining required thickness ($D_0-D_1$) at a constant silica particle flow rate and at a reduced translation speed. The inventive method enables a preform to be overcladded efficiently with improved yield and high quality.

14 Claims, 2 Drawing Sheets

METHOD FOR OVERCLADDING AN OPTICAL FIBER PREFORM

CROSS-REFERENCE TO PRIORITY APPLICATION

This application hereby claims the benefit of pending French Application No. 06/05417 (filed Jun. 19, 2006 at the French Patent Office), which is hereby incorporated by reference in its entirety.

FIELD OF THE INVENTION

The present invention relates to a method for overcladding an optical fiber preform.

BACKGROUND OF THE INVENTION

An optical fiber is produced by drawing a preform on a drawing tower. A preform generally includes a primary preform consisting of a very high quality glass tube that forms a part of the cladding and the fiber core. This primary preform is then overcladded (or sleeved) to increase its diameter and form a preform that can be used on a drawing tower.

Homothetic fiber drawing includes placing the preform vertically in a drawing tower and drawing a strand of fiber from one end of the preform. For this purpose, one tip of the preform is heated locally until the silica softens. The drawing rate and the temperature are controlled during the drawing operation to determine the diameter of the resulting optical fiber.

The primary preform may be fabricated by successively depositing layers of pure and/or doped silica on the inside surface of a glass tube to form an inner cladding and a central core. The deposits in the glass tube are generally formed by chemical vapor deposition (CVD). This kind of deposition is conducted by injecting gaseous mixtures into the glass tube and ionizing the gaseous mixtures. CVD-type deposition encompasses MCVD (modified chemical vapor deposition), FCVD (furnace chemical vapor deposition), and PCVD (plasma enhanced chemical vapor deposition). The glass tube is then closed using a collapsing operation to form the primary preform.

The primary preform is then overcladded using silica particles, typically inexpensive natural silica particles to yield a final preform. The overcladding of the primary preform may be conducted by plasma deposition during which particles of natural silica are projected and fused by a plasma torch at a temperature near 2300° C. At such an elevated temperature, the natural silica particles vitrify on the periphery of the primary preform. The overcladding operation is generally conducted in a closed chamber under a controlled atmosphere to ensure protection against electromagnetic disturbances and the release of ozone that is emitted by the plasma torch.

The geometry of the preform must be well adapted to the ratios of the refractive indexes and diameters of the core and fiber cladding so that the drawn fiber has the required refractive index profile. For optical fibers, the refractive index profile is generally qualified in relation to a plotted graph showing the function associating the refractive index of the fiber with the radius of the fiber.

Precise control of the overcladding operation is therefore required to guarantee the homothetics of the geometry of the final preform and thus the drawn fiber. A target diameter of the final preform is calculated from the diameter of the primary preform and the target profile of the fiber. This target diameter determines the overclad quantity to be deposited on the primary preform. The overclad deposition is then conducted in one or more passes, wherein each pass corresponds to a translation movement of the plasma torch along the primary preform and to the deposition of a controlled quantity of silica particles. Hence, with every overcladding pass, a certain thickness of silica cladding is deposited on the primary preform.

In general, each overcladding pass provides a given thickness (e.g., four millimeters or so) corresponding to a given translation speed and a given silica particle flow rate. It is desirable to attain an overcladded preform that approaches its target diameter, such as accuracy in the order of 0.3 millimeter for a preform having a diameter of 90 to 100 millimeters. One problem, therefore, is to achieve the target diameter of the preform precisely when the second-to-last overcladding pass (i.e., the penultimate overcladding pass) brings the preform to an interim diameter in which less than one pass thickness is needed to complete the overcladding.

One solution is to reduce the flow rate of the silica particles projected onto the preform during the last overcladding pass in order to deposit a thinner overcladding layer and thereby reach the target diameter of the preform. This solution is described, for example, in European Patent Publication No. EP 1279646 A1 (and its counterpart U.S. Publication No. 2003/0024273 A1, which is hereby incorporated by reference in its entirety).

Equipment for overcladding an optical fiber preform is also known from European Patent Publication No. EP 0845441 A1 (and its counterpart U.S. Pat. No. 5,958,102, which is hereby incorporated by reference in its entirety), which describes a first depositing overclad torch along the preform and a plurality of second torches adapted so that each conducts a short back-and-forth movement over a given length of the preform. The longitudinal uniformity of the overcladding deposited along the primary preform is controlled, and one or more of the second torches may be actuated to correct any non-uniformity detected in the overcladding over a given length. The overcladding deposition by the first torch is conducted at a constant speed and with a variable particle flow rate to achieve the target diameter of the preform.

Reducing the flow rate of the silica particles projected at the end of the overcladding operation, however, has the disadvantage of reducing the yield of the overcladding process and inducing a productivity loss. The efficacy of silica particle projection increases with the diameter of the preform being overcladded. At the start of the overcladding operation, a large quantity of silica particles pass beside the primary preform because its diameter is small. Then, as the diameter of the preform increases with the overcladding, an increasing quantity of projected silica particles reaches the preform to be vitrified. In terms of yield with respect to the quantity of particles used, the efficacy of the overcladding operation increases with the diameter of the preform. Reducing the flow rate of the particles during the last pass thus cancels out this increase in yield and reduces the overall productivity of the overcladding operation of the preform.

Equipment for overcladding an optical fiber preform is also known from European Patent Publication No. EP 0482348 A2 (and its counterpart U.S. Pat. No. 5,183,490, which is hereby incorporated by reference in its entirety), which discloses continuously controlling the quantity of overcladding deposited using a calculation of the weight of the preform. When the preform reaches a target weight, the overcladding is stopped. This document, however, does not indicate how the end of the overcladding operation is controlled.

Therefore, there is a need for an easily implemented optical fiber overcladding method that facilitates the precise achievement of the target preform diameter without productivity loss.

SUMMARY OF THE INVENTION

It is, therefore, a purpose of the invention (i) to anticipate the target diameter of the preform before the preform diameter becomes such that less than one pass thickness is required to terminate the overcladding and (ii) to reduce the translation speed of the torch along the preform to increase the thickness of a last pass (and not, as described in the prior art, to reduce the flow rate of the projected silica particles and thus the deposition thickness of the last pass).

More particularly, the invention proposes a method for overcladding an optical fiber preform having a given, final preform target diameter. This method includes the following steps: (1) providing a primary preform to be overcladded; (2) successively depositing first overcladding layers by projecting and vitrifying silica particles on the primary preform in relative translation with a plasma torch, each first overcladding layer having a substantially uniform thickness and being deposited at a given, substantially constant silica particle flow rate and at a given, substantially constant translation speed; (3) detecting a preform diameter that exceeds a given threshold but that is below the target diameter of the preform minus the thickness of a first overcladding layer; and (4) depositing the last overcladding layer having the remaining required thickness at a reduced translation speed and at a silica particle flow rate that is kept substantially constant.

According to one embodiment, the given threshold to conduct deposition of the last overcladding layer is equal to the target diameter of the preform minus the thickness of three first overcladding layers.

According to another embodiment, the given threshold to conduct deposition of the last overcladding layer is equal to the target diameter of the preform minus the thickness of two first overcladding layers.

The deposition of the last overcladding layer may be made at a translation speed which, with respect to the constant translation speed for the deposition of the preceding overcladding layers, is reduced by a factor that is equal to the ratio of the constant thickness of a preceding layer over the remaining required thickness, in accordance with the following equation:

$$V' = V \cdot \frac{d}{D_0 - D_1}$$

in which V' is the reduced translation speed for depositing the last layer; V is the constant translation speed for depositing the preceding layers; $D_0 - D_1$ is the remaining required thickness of the overcladding; and d is the constant thickness of the preceding overcladding layers.

According to one embodiment, the first overcladding layers have a substantially uniform thickness of between about three millimeters and six millimeters (e.g., between about four millimeters and five millimeters).

The invention also embraces equipment for the overcladding of an optical fiber primary preform with a given target diameter of the final preform. The equipment includes the following: a support to receive a primary preform; at least one plasma torch; a device (e.g., a glass working lathe) for translating the primary preform and/or the plasma torch to allow relative translation of the torch along the primary preform at a controlled speed; mechanisms (e.g., a piping and such) for delivering and projecting silica particles at a controlled particle flow rate; preform measuring instrumentation (e.g., optical devices) for determining the diameter of the preform during the overcladding operation; and a control unit adapted to receive the diameter measurement of the preform and adapted to impose a given, substantially constant silica particle flow rate, and a given, substantially constant translation speed for as long as the measured diameter of the preform is less than a threshold value. The control unit (e.g., an electronic unit) is adapted to control deposition of a last overcladding layer having the required remaining thickness at a silica particle flow rate maintained substantially constant and at a reduced translation speed.

Other advantages and characteristics of the invention will become apparent on reading the following description of embodiments of the invention given by way of example and with reference to the drawings.

DETAILED DESCRIPTION

In one aspect, the invention proposes a method for overcladding an optical fiber preform. The final optical fiber preform has a given target diameter ($D_0$), which may be in the order of 80 millimeters to 150 millimeters when drawing a single mode fiber, or in the order of 30 millimeters to 45 millimeters when drawing a multimode fiber. The primary preform (e.g., a silica tube in which an optical core and cladding have been deposited by any CVD technique) has a diameter in the order of 20 millimeters to 40 millimeters depending on the applications.

Figure 1:
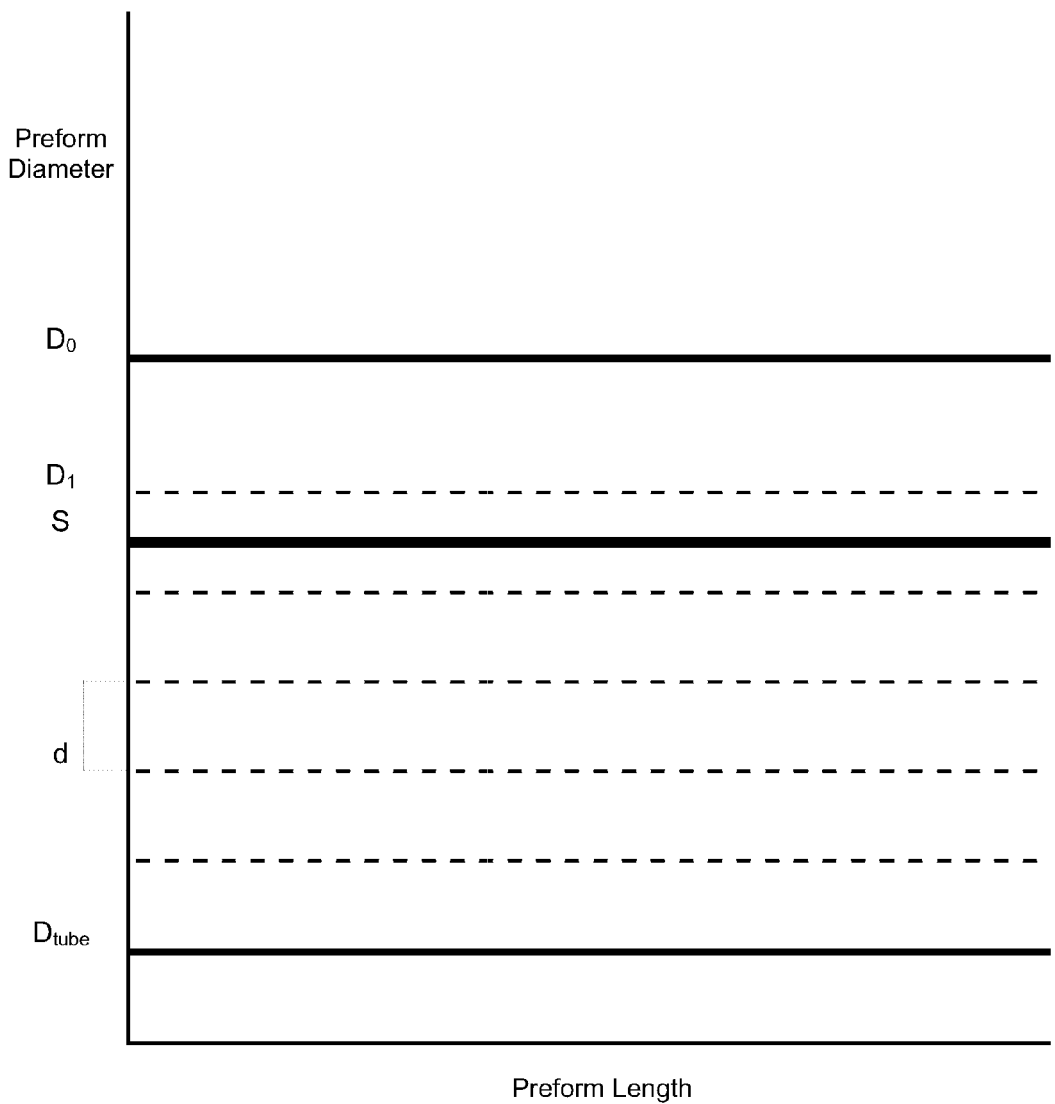
FIG. 1 is a schematic graph illustrating the incremental overcladding of an optical fiber preform, giving the length of the preform along the horizontal axis and the diameter of the preform along the vertical axis.

FIG. 1 shows the diameter of the primary preform ($D_{tube}$) and the target diameter of the final preform ($D_0$). The required increase from the diameter of the primary preform ($D_{tube}$) to the final diameter ($D_0$) is achieved by overcladding the preform.

The primary preform is overcladded in several passes by depositing successive layers of overcladding until the target diameter ($D_0$) of the final preform is reached. Each overcladding layer is deposited in one pass by projecting and vitrifying silica particles on the preform moving in relative translation with at least one plasma torch. Preferably, natural silica, which is relatively inexpensive, is used. Synthetic and/or doped silica particles, which are relatively more expensive, may also be used within the scope of the invention.

The inventive method proposes depositing the initial overcladding layers at a given constant flow rate (Fx) of the silica particles and at a given constant translation speed (V). Each overcladding layer deposited thus has a substantially uniform thickness d (e.g., between 3 millimeters and 6 millimeters).

The inventive method further proposes detecting a preform diameter $D_1$ during the overcladding operation. Preform diameter $D_1$ equals or exceeds a given threshold S, which corresponds to a preform diameter such that more than one pass, but less than two or three passes, of uniform thickness d are required to terminate the overcladding operation.

The inventive method therefore proposes the deposition of a last overcladding layer having the required remaining thickness ($D_0$−$D_1$) at a silica particle flow rate Fx that is constant but at a reduced translation speed V' that is less than V, the constant initial translation speed.

For example, as illustrated in FIG. 1, the given threshold S may be equal to the target diameter $D_0$ minus the thickness of two overcladding layers deposited at constant translation speed V and constant particle flow rate Fx. The deposition of the last overcladding layer is therefore achieved by detecting a preform diameter $D_1$ such that more than one layer of uniform thickness d is required to terminate overcladding, but less than two overcladding layers of uniform thickness d are required to reach the target diameter $D_0$ (i.e., a diameter $D_1$ such that $D_0-2d \leq D_1 \leq D_0-d$).

According to another, non-illustrated, example, the given threshold S may be equal to the target diameter $D_0$ minus the thickness of three overcladding layers deposited at a constant translation speed V and constant particle flow rate Fx. The deposition of the last overcladding layer is therefore conducted upon the detection of a preform diameter $D_1$, such that more than one layer of uniform thickness d is required to terminate overcladding but less than three overcladding layers of uniform thickness d are required to reach the target diameter $D_0$ (i.e., a diameter $D_1$ such that $D_0-3d \leq D_1 \leq D_0-d$).

A final pass, which is of greater thickness than the uniform thickness d of the initial passes, is then carried out. This stands in contrast to methods that propose a last pass of lesser thickness than the preceding passes.

For this purpose, the inventive method proposes reducing the translation speed V' of the last pass with respect to the translation speed V of the other passes while maintaining a constant flow rate Fx of the particles projected onto the preform. In particular, the translation speed V' of the last pass is reduced with respect to the constant deposition speed V of the preceding layers by a factor that is equal to the ratio of the constant thickness of a preceding layer (d) over the remaining required thickness ($D_0-D_1$). The reduced speed of the last pass can therefore be expressed in relation to the constant speed of the other passes in accordance with the following equation:

$$V' = V \cdot \frac{d}{D_0 - D_1}$$

The thickness of the last deposited layer is therefore increased by reducing the translation speed V' of the plasma torch. The duration of the last, thicker pass is longer than the preceding passes, but the overall duration of the overcladding process is not affected because the last pass of the inventive method replaces the two or three last passes of the prior art methods. The inventor has found that the quality of the silica deposited in a thick layer during the final pass is as good as the silica of the preceding, thinner layers. In addition, because the particle flow rate remains constant the particle vitrification yield on the preform is no longer affected at the end of the process.

Figure 2:
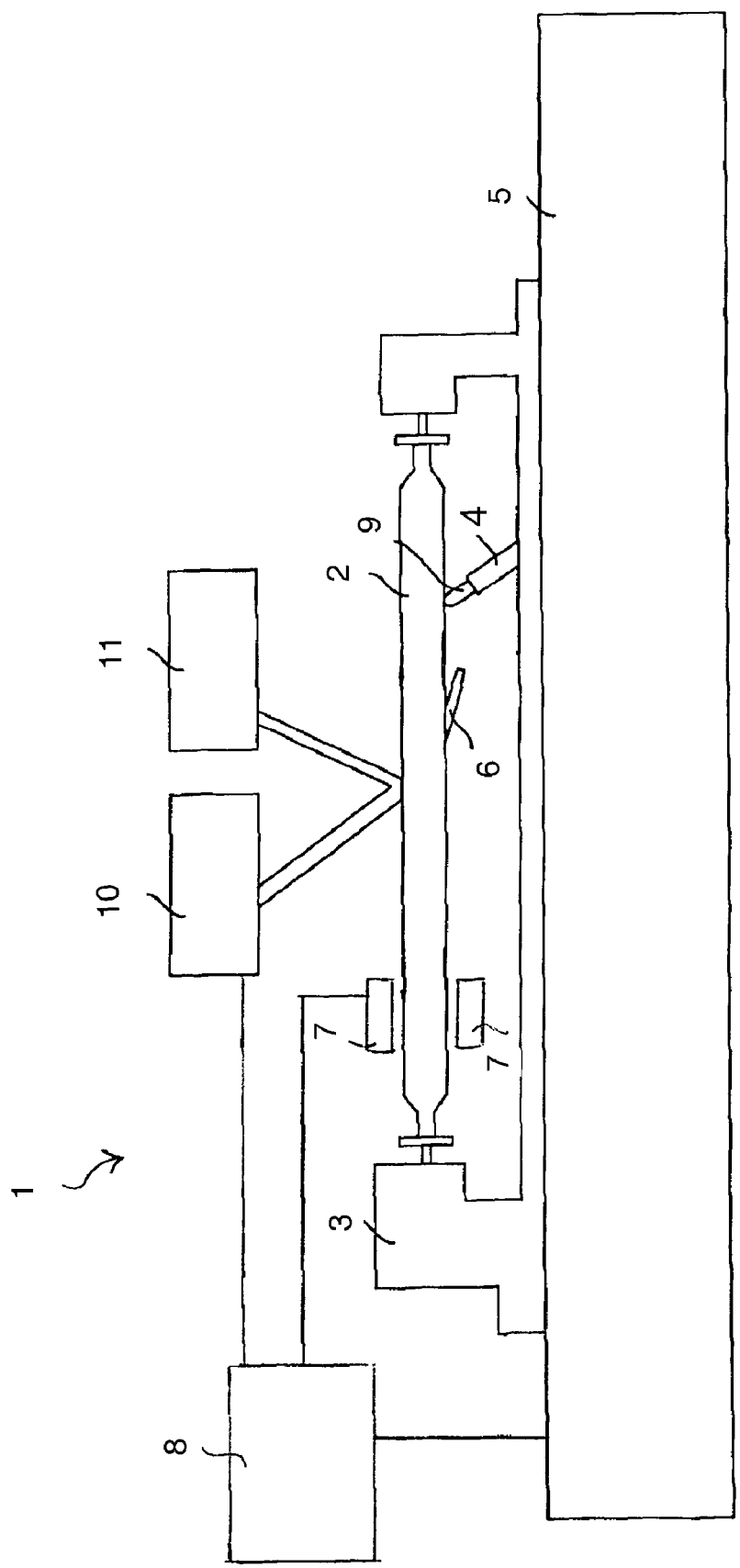
FIG. 2 is a schematic presentation of the equipment according to the present invention.

FIG. 2 schematically depicts equipment 1 for the overcladding of an optical fiber preform 2 with a given, final preform target diameter $D_0$. The overcladding equipment 1 includes a support 3 to receive a preform 2 and a plasma torch 4 (with plasma flame 9). A constant gas flow (not shown) is fed to plasma torch 4 to maintain plasma flame 9. (An exemplary device for making a glass preform using a plasma torch is disclosed in U.S. Publication No. 2001/0015080, which is hereby incorporated by reference in its entirety.)

The overcladding equipment 1 further includes a device 5 for translating (e.g., moving with little or no rotation) the preform 2 or the plasma torch 4 (or both) to allow a relative movement of the plasma torch 4 along the preform 2 at a controlled speed. A suitable translating device 5 in this regard is a glass-working lathe, which may be clamped to the preform 2. Glass-working lathes are known to those having ordinary skill in the art.

By way of example, used as the translating device 5, the glass working lathe permits (i) the preform 2 to be moved in translation while the plasma torch 4 is kept stationary, (ii) the plasma torch 4 to be moved in translation while the preform 2 is kept stationary, or (iii) both the preform 2 and the plasma torch 4 to be moved in translation with respect to each other.

The overcladding equipment 1 further includes a discharge feed line 6 for delivering and projecting silica particles at a controlled flow rate, the silica particles being stored in a particle reservoir 10. The discharge feed line 6 is, for example, a tube (e.g., silica, ceramic, or metal) that can be positioned to direct or otherwise guide the silica particles to the desired location on the preform 2. The discharge feed line 6 may terminate in a conical-shaped end (e.g., a nozzle) to better direct the silica particles onto the preform 2. Those having ordinary skill in the art will appreciate that the delivery and projection of silica onto the preform 2 may also employ silica sprayers or silica injectors.

The overcladding equipment 1 further includes a preform measuring apparatus 7 for measuring the diameter of the preform during the overcladding operation. The preform measuring apparatus 7 embraces various measurement instrumentation known to those having ordinary skill in the art.

The overcladding equipment 1 still further includes a control unit 8 that is adapted to receive (from the preform measuring apparatus 7) the diameter measurement of the preform 2. The control unit 8 is also adapted to impose a given substantially constant silica particle flow rate and a given substantially constant translation speed for as long as the measured diameter $D_1$ of the preform 2 is less than the set threshold value S. The control unit 8 is further adapted to control deposition of a final overcladding layer having the required remaining thickness (i.e., $D_0-D_1$) at a substantially constant silica particle flow rate Fx at a reduced translation speed (i.e., V'<V).

The preform 2 is mounted onto the sides of the support 3 such that the support 3 rotates the preform 2 about the preform's longitudinal axis. By way of example, the support 3 rotates the preform 2 with a rotational velocity of between about 1 and 50 revolutions per minute, more typically between about 3 and 30 revolutions per minute.

In a typical embodiment schematically depicted in FIG. 2, the discharge feed line 6 is connected to both the silica particle reservoir 10 and a gas reservoir 11. The silica particles in the particle reservoir 10 may be transported (e.g., gravity fed) to the discharge feed line 6 via of a hopper (not shown). The flow of silica particles is then combined with the gas from the gas reservoir 11. Thus, in operation (i.e., during the overcladding process) the silica particles and the gas pass through the discharge feed line 6 simultaneously. Such a configuration enables the respective flows of gas and silica particles leaving the discharge feed line 6 to be accurately and precisely controlled.

The gas reservoir 11 may contain a single gas or a mixture of more than one kind of gas. The gas reservoir 11 may also include a gas supply system, which may include several gas supply sources and flow controllers. An exemplary gas for use during the overcladding of a preform 2 with silica particles is sulfur hexafluoride ($SF_6$).

In another embodiment, the invention embraces equipment 1 for overcladding an optical fiber preform 2 wherein a silica particle projector may be integrated into the plasma torch 4 (e.g., the discharge feed line 6 may terminate into the plasma torch 4). In this regard, silica particles are projected onto the preform 2 at a given, constant flow rate Fx. The preform 2 rotates and the plasma torch 4 moves in translation along the preform 2. Alternatively, a two-fold movement may be imparted to the preform 2 (i.e., rotating about itself while translating in front of the plasma torch 4). The speed of translation of the plasma torch 4 along the preform 2 (or vice-versa) is controlled by a control unit 8.

As noted, maintaining the plasma flame 9 requires a gas flow to the plasma torch 4, but the gas need not be sulfur hexafluoride. Although it is possible to feed sulfur hexafluoride gas to the plasma torch 4 (either with or without silica particles), it is more typical to simultaneously deliver silica particles and sulfur hexafluoride gas to the preform 2 via the discharge feed line 6. In that case, another kind of gas may be used to maintain the plasma flame 9.

The overcladding equipment 1 also includes preform measuring apparatus 7 for determining the (increasing) diameter of the preform 2 during the overcladding operation. The preform measuring apparatus 7 embraces, for instance, an industrial viewing system that includes a measuring instrument (e.g., a camera or laser micrometer) and a signal-processing unit of PC-computer kind or commercial display unit. The overcladding equipment 1 also includes a control unit 8 adapted to receive the measurement of the preform diameter and to maintain a constant flow rate Fx of the silica particles and a given constant translation speed V for as long as the measured preform diameter $D_1$ is less than a threshold value S.

When the electronic control unit 8 detects (e.g., after a certain pass or layer is completed) that the preform diameter $D_1$ has reached or exceeded this threshold value S, such that less than two or three passes of uniform thickness d are required to reach the target diameter $D_0$, it initiates deposition of a last overcladding layer having the remaining required thickness ($D_0-D_1$). In accordance with the foregoing, this final deposition layer is carried out at a constant silica particle flow rate Fx and a reduced translation speed V'.

The inventive method and the associated overcladding equipment 1 permit an optical fiber preform 2 to be overcladded to an accurate and precise target diameter while improving productivity.

In the specification and the figures, typical embodiments of the invention have been disclosed. Specific terms have been used only in a generic and descriptive sense, and not for purposes of limitation. The scope of the invention is set forth in the following claims.

The invention claimed is:

1. A method for overcladding an optical fiber preform having a given, final preform target diameter ($D_0$), the method comprising the steps of:
    providing a primary preform to be overcladded;
    successively depositing first overcladding layers by projecting and vitrifying silica particles on the primary preform in relative translation with a plasma torch, each first overcladding layer having a given, substantially constant thickness (d) and, over the entire duration of its deposition along the length of the primary preform, each first overcladding layer being deposited at a given, substantially constant silica particle flow rate (Fx) and at a given, substantially constant translation speed (V), and wherein each first overcladding layer's silica particles are vitrified before the projection and vitrification of the next successive first overcladding layer;
    detecting a preform diameter ($D_1$) that exceeds a given threshold (S) but is less than the final preform target diameter ($D_0$) minus a thickness (d) of a first overcladding layer ($D_1<D_0-d$); and
    depositing a last overcladding layer having the remaining required thickness ($D_0-D_1$) at a silica particle flow rate that is kept substantially constant (Fx) over the entire duration of the last overcladding layer's deposition along the length of the primary preform and at a reduced translation speed (V'<V) that is kept substantially constant over the entire duration of the last overcladding layer's deposition along the length of the primary preform.

2. The method of claim 1, wherein the step of depositing the last overcladding layer is made at a translation speed (V') which, with respect to the constant translation speed (V) for the depositing of the preceding overcladding layers, is reduced by a factor that is equal to the ratio of the constant thickness (d) of a preceding layer over the remaining required thickness ($D_0-D_1$), in accordance with the following equation:

$$V' = V \cdot \frac{d}{D_0 - D_1}.$$

3. The method of claim 1, wherein the given threshold (S) to conduct deposition of the last overcladding layer is equal to the final preform target diameter ($D_0$) minus the thickness of three first overcladding layers deposited at a constant particle flow rate and speed ($D_0-3d$).

4. The method of claim 3 wherein the step of depositing the last overcladding layer is made at a translation speed (V') which, with respect to the constant translation speed (V) for the depositing of the preceding overcladding layers, is reduced by a factor that is equal to the ratio of the constant thickness (d) of a preceding layer over the remaining required thickness ($D_0-D_1$), in accordance with the following equation:

$$V' = V \cdot \frac{d}{D_0 - D_1}.$$

5. The method of claim 1, wherein the given threshold (S) to conduct deposition of the last overcladding layer is equal to the final preform target diameter ($D_0$) minus the thickness of two first overcladding layers deposited at a constant particle flow rate and speed ($D_0-2d$).

6. The method of claim 5, wherein the step of depositing the last overcladding layer is made at a translation speed (V') which, with respect to the constant translation speed (V) for the depositing of the preceding overcladding layers, is reduced by a factor that is equal to the ratio of the constant thickness (d) of a preceding layer over the remaining required thickness ($D_0-D_1$), in accordance with the following equation:

$$V' = V \cdot \frac{d}{D_0 - D_1}.$$

7. The method of claim 1, wherein the first overcladding layers have approximately constant thickness (d) of between about 3 millimeters and 6 millimeters.

8. The method of claim 1, wherein the step of depositing the last overcladding layer comprises projecting and vitrifying silica particles.

9. A method for overcladding an optical fiber preform, the method comprising:
   providing a primary glass preform to be overcladded;
   establishing a final preform target diameter ($D_0$);
   successively depositing initial overcladding layers by (i) projecting silica particles at a substantially constant flow rate (Fx) and a substantially constant translation speed (V) over the entire duration of each initial overcladding layer's deposition along the length of the primary preform and (ii) vitrifying the silica particles on the primary glass preform using at least one plasma torch, wherein each initial overcladding layer has about a substantially uniform thickness (d), and wherein each initial overcladding layer's silica particles are vitrified before the projection and vitrification of the next successive initial overcladding layer;
   detecting a preform diameter ($D_1$) that (i) is less than the final preform target diameter ($D_0$) minus the substantially uniform thickness (d) of an initial overcladding layer and (ii) is greater than the final preform target diameter ($D_0$) minus 3X the substantially uniform thickness (d) of an initial overcladding layer ($D_0-3d<D_1<D_0-d$);
   thereupon determining the remaining required thickness ($D_0-D_1$) to achieve final preform target diameter ($D_0$); and
   depositing a final overcladding layer having about the remaining required thickness ($D_0-D_1$), wherein over the entire duration of the final overcladding layer's deposition along the length of the primary preform, the final overcladding layer is deposited (i) at the substantially constant silica particle flow rate (Fx) used to form the initial overcladding layers but (ii) at a reduced translation speed (V') that is less than the substantially constant translation speed (V) used to form the initial overcladding layers, wherein the reduced translation speed (V') is determined by the following equation:

$$V' = V \cdot \frac{d}{D_0 - D_1}.$$

10. The method of claim 9, wherein the step of successively depositing initial overcladding layers comprises successively depositing initial overcladding layers by projecting and vitrifying silica particles at a substantially constant flow rate (Fx) and a substantially constant translation speed (V) until the preform achieves a diameter ($D_1$) that (i) is less than the final preform target diameter ($D_0$) minus the substantially uniform thickness (d) of an initial overcladding layer and (ii) is greater than the final preform target diameter ($D_0$) minus 3X the substantially uniform thickness (d) of an initial overcladding layer ($D_0-3d<D_1<D_0-d$).

11. The method of claim 9, wherein the step of successively depositing initial overcladding layers comprises successively depositing initial overcladding layers by projecting and vitrifying silica particles at a substantially constant flow rate (Fx) and a substantially constant translation speed (V) until the preform achieves a diameter ($D_1$) that (i) is less than the final preform target diameter ($D_0$) minus the substantially uniform thickness (d) of an initial overcladding layer and (ii) is greater than the final preform target diameter ($D_0$) minus 2X the substantially uniform thickness (d) of an initial overcladding layer ($D_0-2d<D_1<D_0-d$).

12. The method of claim 9, wherein the step of detecting a preform diameter (DJ comprises detecting a preform diameter ($D_1$) that (i) is less than the final preform target diameter ($D_0$) minus the substantially uniform thickness (d) of an initial overcladding layer and (ii) is greater than the final preform target diameter ($D_0$) minus 2X the substantially uniform thickness (d) of an initial overcladding layer ($D_0-2d<D_1<D_0-d$).

13. The method of claim 9, wherein the step of successively depositing initial overcladding layers comprises depositing initial overcladding layers each having a substantially uniform thickness of between about 3 millimeters and 6 millimeters.

14. The method of claim 9, wherein the step of depositing the final overcladding layer comprises projecting and vitrifying silica particles.

* * * * *